Feb. 1, 1955          F. N. SULLIVAN          2,701,091
                         CONTAINER
Filed Oct. 1, 1949                        3 Sheets-Sheet 2
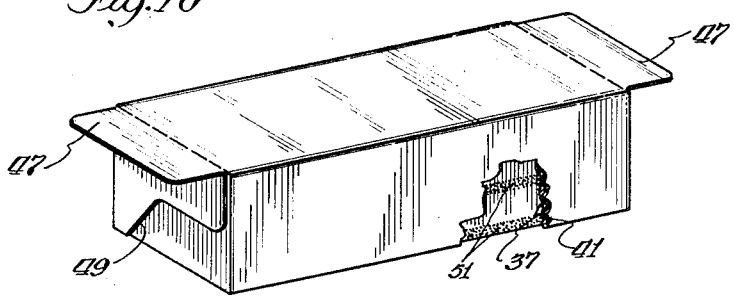
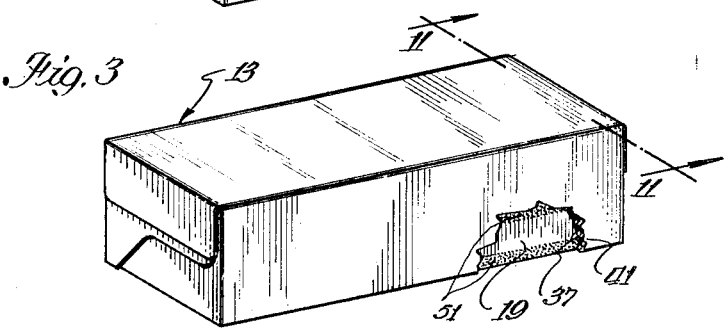
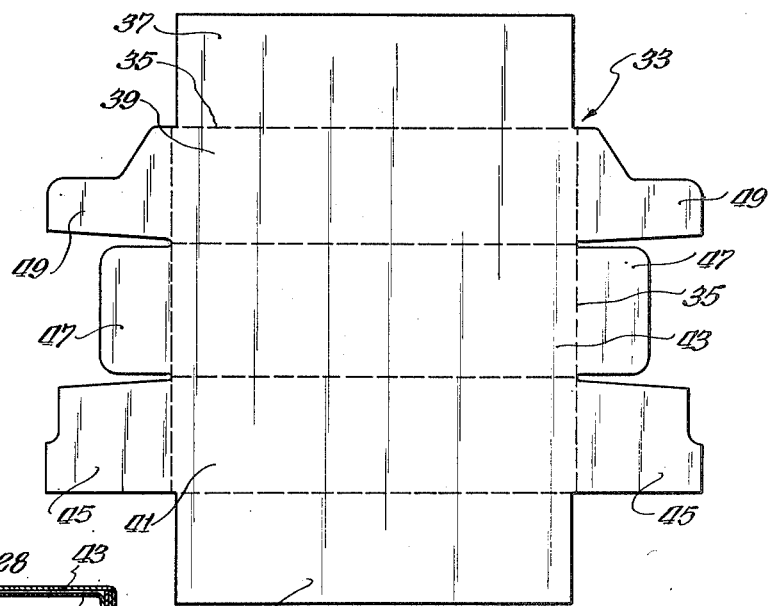
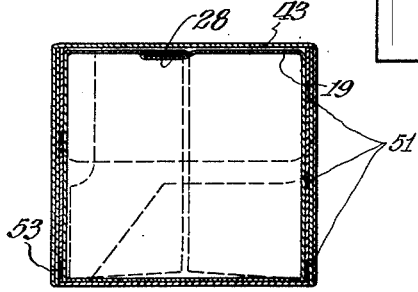
Inventor:
Frank N. Sullivan
By: Soans, Pond & Anderson
attys.

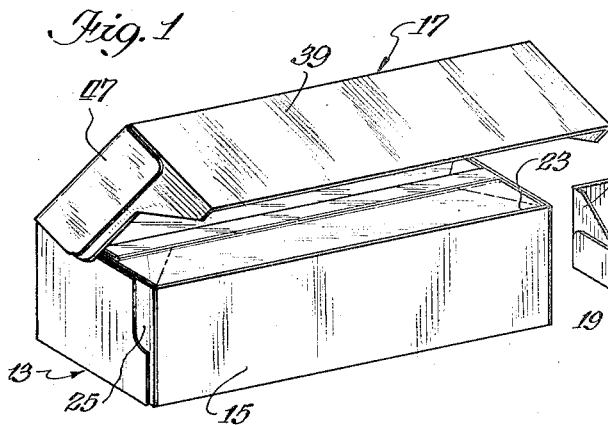
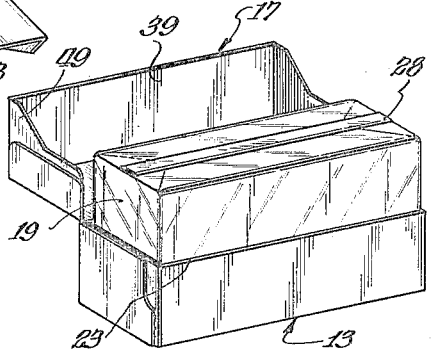
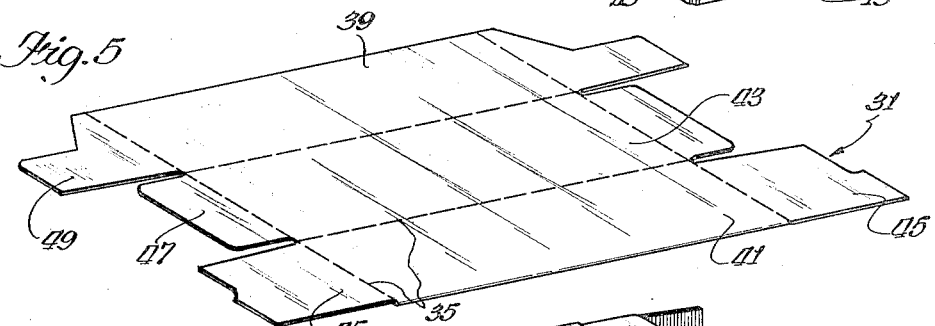
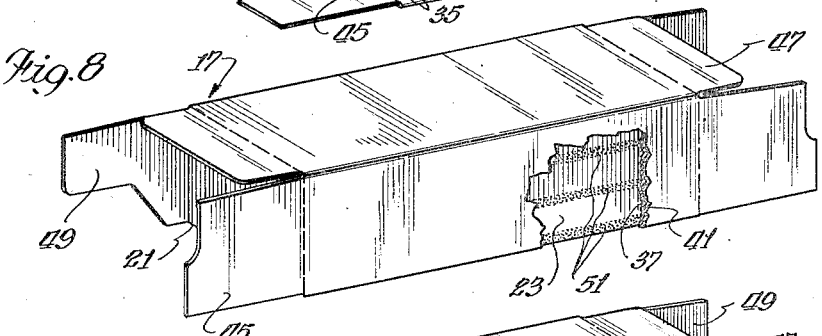
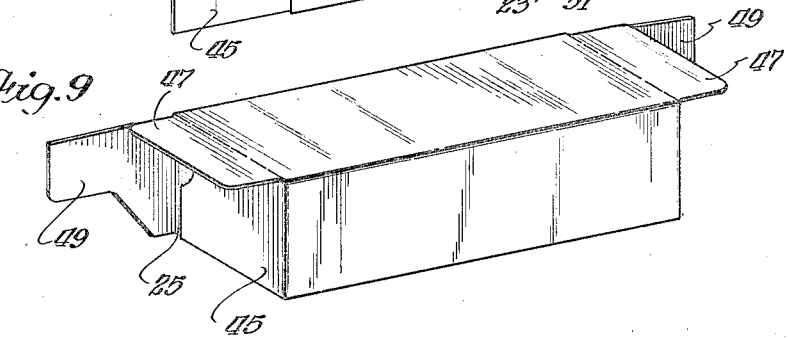

Feb. 1, 1955 — F. N. SULLIVAN — 2,701,091
CONTAINER
Filed Oct. 1, 1949 — 3 Sheets-Sheet 3
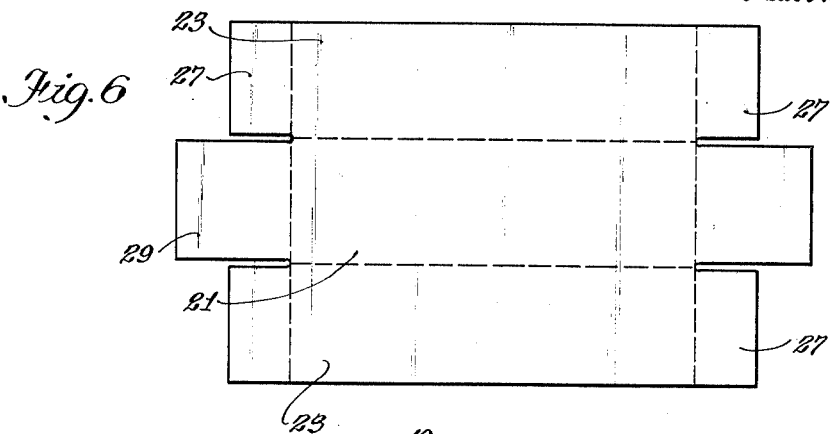
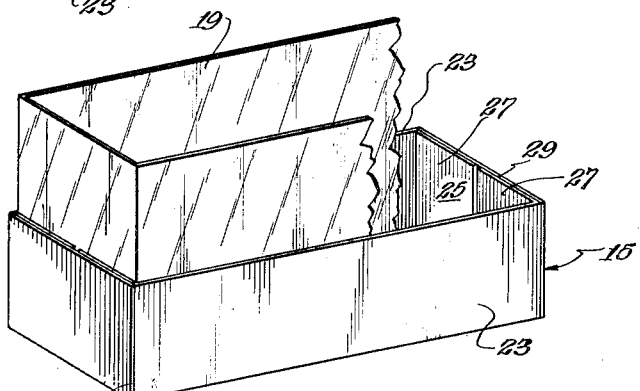
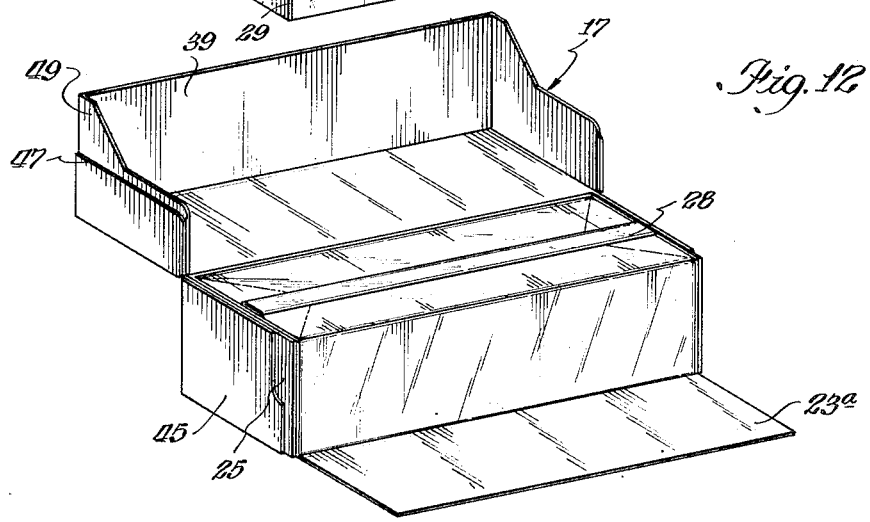
Inventor:
Frank N. Sullivan
By: Soans, Pond & Anderson
Atty's.

[Patent No.] 2,701,091
[Patented] Feb. 1, 1955

United States Patent Office

2,701,091

CONTAINER

Frank N. Sullivan, Chicago, Ill., assignor to Kraft Foods Company, Chicago, Ill., a corporation of Delaware Application October 1, 1949, Serial No. 119,049

2 Claims. (Cl. 229—23)

The present invention relates generally to a container and more particularly concerns an improved container for process cheese and other materials of like character.

Originally, process cheese and similar products were packaged in wooden boxes which were lined with a layer of tin foil or the like. The foil lined boxes were filled while the cheese was in a melted or fluid state, and a layer of foil was placed across the exposed surface of the cheese after the box had been filled. A lid or cover was then stapled or nailed onto the top of the box, thereby enclosing the cheese. When the ultimate consumer received the package, it was opened by prying the top from the box, and the cheese was removed from the container. After the desired amount of cheese was used, the remaining portion was replaced in the box and stored under refrigeration.

The wooden boxes provided very sturdy containers for cheese and protected it from damage during shipment, storage, household use, etc. In addition, boxes of this type had sufficient strength to adequately support the melted cheese during the pouring operation. More recently, however, as a result of the high cost of wooden boxes and the difficulty of storing and handling them in the packaging plants, the cheese industry has turned to the use of paperboard containers. While the presently known paperboard containers are satisfactory for purposes of shipment, they have not been entirely suitable for storage and continued use about the home. Moreover, the paperboard boxes must pass through the usual filling machinery and, therefore, the known paperboard boxes have been utilitarian in nature rather than being decoratively designed for merchandising purposes.

Accordingly, the principal object of this invention is the provision of a box construction which will overcome the deficiencies of the known paperboard packages. More specific objects of the invention are the provision of a paperboard container which will pass through the filling machinery usually employed in charging containers with fluid cheese without deforming the container and which will, at the same time, be decorative, strong, and capable of being repeatedly opened. A further object of the invention is the provision of a box which is inexpensive to manufacture and easy to fabricate. Other objects and advantages of the invention will become known by reference to the accompanying drawings and subsequent description.

In the drawings:

Fig. 1 is a perspective view of a filled container embodying various of the features of the invention;

Fig. 2 is a view similar to Fig. 1 which shows the manner of removing a block of process cheese from the container shown in Fig. 1;

Fig. 3 is a perspective view, partly broken away, of the rearward side of the container shown in Fig. 1, the container being closed for shipment or storage;

Fig. 4 is a plan view of the blank employed in forming one section of the carton shown in the preceding figures;

Fig. 5 is a perspective view of the blank shown in Fig. 4, after a preliminary forming operation;

Figs. 6 to 10, inclusive, are perspective views showing the various steps involved in packaging process cheese in a container fabricated in accordance with the invention;

Fig. 11 is a sectional view taken on line 11—11 in Fig. 3; and

Fig. 12 is a perspective view illustrating a modification of the invention.

A completed container 13, embodying various of the features of the invention, is illustrated in Figs. 1, 2, and 3 of the drawings. The container 13 is fabricated in two sections, one of which comprises an open-topped box, illustrated as 15 in the drawings, and the other of which comprises a wrapper or jacket 17 which provides a top closure for and which extends around the box section 15. In addition, the jacket section 17 serves to provide a decorative, reinforcing cover for the container 13.

The box section 15 is adapted to receive an inner liner or envelope 19, which is fabricated from grease resistant material, such as cellophane, a rubber hydrochloride film, waxed paper, or the like, and into which the cheese or other foood product is poured during the filling operation. The box section 15 is fabricated from the plane blank shown in Fig. 6 and includes portions which provide a bottom 21, side walls 23, and interconnected end walls 25. The end walls 25 in the illustrated box section are of two-ply construction and comprise a pair of inwardly extending flaps 27 which are integral with the side walls 23, and an upwardly extending portion 29 which constitutes an extension of the bottom 21. The flaps 27 and the portion 29 are glued or otherwise attached together as shown in Fig. 7.

After the melted cheese or other material is poured into the liner 19 in the box section 15, the liner 19 is sealed manually or by any of several known mechanisms to provide a substantially air-tight enclosure for the food product disposed therein. The seal may take the form illustrated at 28 in Figs. 2, 11, and 12 of the drawings, this type of seal being automatically effected by a package sealing apparatus of the type shown in Palmer Patent No. 2,331,927.

The jacket section 17 of the container 13 is fabricated from the blank 31 shown in Fig. 5. This blank 31 is made from a strip of material 33, which is of the shape illustrated in Fig. 4. The strip 33 is creased and scored to provide the fold lines, represented by the dotted lines 35 in Figs. 4 and 5, and includes a number of panels and symmetrically disposed tabs and flaps which provide the ends of the jacket portion 17.

The paperboard strip 33 for small containers, i. e. a container for holding say two pounds of cheese, will desirably be from about 0.020 to about 0.030 inches in thickness but lighter or heavier board may be employed. Before assembly, the paperboard strip 33 is finished on one side with labeling indicia which serve to identify the finished product. The strip 33 is divided longitudinally into a pair of reinforcing or backing panels 37 and 37a disposed at opposite sides of the strip 33, a pair of side-wall panels 39 and 41 adjoining the respective backing panels 37 and 37a, and a top panel 43 which is located intermediate the side-wall panels 39 and 41.

In order to provide the ends of the jacket 17 a tab or flap is disposed at each end of each of the side-wall panels 39 and 41 and the top panel 43. As shown in Figs. 4 and 5, an attaching flap 45 is provided at each end of the side-wall panel 41 (the back wall of the jacket 17), a reinforcing flap 49 is provided at each end of the side-wall panel 39 (the forward wall of the jacket), and a tab 47 is provided at each end of the top panel 43. The tabs 47 and flaps 45 and 49 may be cut in any of several desired shapes. The attaching flaps 45, illustrated, generally conform to the dimensions of the end sections 25 of the box 15 and the flaps 49 are cut away as shown in Fig. 4. The tabs 47 are generally rectangular in shape, the outer edges being rounded to produce a pleasing contour in the assembled container 13.

Prior to assembling the jacket section 17, the reinforcing panels 37 and 37a of the strip 33 are folded inwardly to provide two-ply, double strength side panels 39 and 41 and as a result of this folding, the blank 31, illustrated in Fig. 5 is produced. The folded together portions of the strip 33 are glued or otherwise attached to permanently interconnect the backing panels 37 and 37a and side panels 39 and 41.

The container 13 is preferably assembled by applying the blank 31 to the box 15. Of course, the box 15 has been previously formed in any well known manner from the blank shown in Fig. 6 and contains cheese or the like to be packaged. During assembly, the box 15 is preferably employed as a mandrel for the blank and the first operation in assembling the container 13 is to fold the side panels 39 and 41 of the blank 31 downwardly across the sides 23 of the box section 15 to bring the jacket 17 into a position overlying one of the sides 23 of the box 15 as shown in Fig. 8. The side panel 41, the back panel of the jacket 17 in the illustrated embodiment of the container, is attached to the contiguous side wall 23 of the box 15 to rigidly interconnect the jacket 17 and the box 15. As shown in Fig. 8, the back panel 41 may be bonded to the side wall 23 of the box 15 by a number of glue lines 51 or the like.

The front panel 39 is desirably semi-permanently connected to the other side wall 23 of the box section 15 by a single glue line 53 (Fig. 11) which is disposed along the lower portion of the box section 15. This semi-permanent connection may be readily broken by inserting a knife or similar implement intermediate the box section 15 and jacket 17 and drawing it longitudinally of the container 13.

To complete the assembly of the container 13, the end attaching flaps 45 are folded forwardly across the end sections 25 of the box 15 and are glued or otherwise attached to the respective ends of the box 15. (Fig. 9.) The reinforcing flaps 49, which are disposed at opposite ends of the front panel 39 of the jacket 17, are folded rearwardly across the flaps 45 to the position shown in Fig. 10. The tabs 47, which extend outwardly from each end of the top panel 43, are then folded downwardly and glued to the flaps 49 associated with the front panel 39, as shown in Fig. 3.

From the foregoing description, it is apparent that each side wall of the container 13 comprises the side wall 23 of the box section 15, the reinforcing or backing panel 37 or 37a and a side panel 39 or 41. The ends of the container 13 are also of multi-ply construction including the two plies of the ends 25 of the box section 15, the flaps 49, the tabs 47 and the end attaching flaps 45. As a result of this construction, a container of the type illustrated is very strong and is particularly adapted for storage and handling.

When it is desired to open the container 13, the semi-permanent seal between the wrapper 17 and box section 15 may be broken whereupon the front panel 39, the top 43, and the interconnected flaps and tabs 49 and 47 respectively may be swung upwardly as a unit about the fold intermediate the back panel 41 and the top 43 (Figs. 1 and 2). This trunk-like, opening action permits ready access to the contents of the container 13. After the desired amount of the contents of the container is used, the remainder may be replaced in the box and the cover and associated panels may be swung back into a closed position.

Removal of the packaged material from the container 13 may be facilitated by making the interior of the box section more accessible when the container 13 is opened. This may be done by perforating the opposite edges of the side wall 23a of the box 15 which is associated with the front panel 39 as shown in Fig. 12. The forward wall 23a may then be folded downwardly by tearing along these perforated edges. Similarly, the side wall 23a of the box section 15 may be unattached to the end sections 25 so that when the jacket 17 is opened as shown in Fig. 12, the side wall will drop, thereby permitting immediate access to the contents of the container. However, when these modifications are employed, it may be necessary to place the box 15 in a form or brace when the melted cheese is poured into the envelope 19.

In the foregoing there has been described an improved container construction and method of container fabrication. A container in accordance with the invention is adapted to withstand relatively heavy crushing loads even though relatively light-weight material is used in fabricating the side walls of the container. Furthermore, the container may be readily opened and closed innumerable times without adversely effecting the strength of the container. In addition, the portions of the container which pass through the filling machinery, i. e. the box section, may be fabricated from inexpensive material and any adverse effects upon the appearance of this box caused by the filling machinery are effectively masked by the jacket section. Moreover, the jacket 17 is inexpensive to manufacture and to decorate since substantially all of the area of the jacket is available for printing and there are no concealed areas within the package which require finishing.

Various of the features of the invention which are believed to be new are set forth in the appended claims.

I claim:

1. In combination with an inner box having a bottom, a pair of side walls foldably connected thereto, and end sections foldably connected to opposite end portions of said bottom and said side walls, an openable enclosure for said inner box having walls on all four of its sides and comprising a top panel, a pair of side panels foldably connected thereto, one of said side panels being attached to the outer side of one of said side walls, a first pair of flaps foldably connected to opposite end portions of said one side panel, said flaps being attached to the outer side of the end sections of said inner box, a second pair of flaps foldably connected to opposite end portions of the other side panel and disposed across the end sections of said box, and a pair of tabs foldably attached to opposite end portions of said top panel and folded downwardly over each of said second pair of flaps and attached thereto, said second pair of flaps and said tabs being disposed on the outside of said end sections and combining with said first pair of flaps to entirely cover said end sections of the inner box, and said side panels being coextensive with the area of said side walls, whereby said openable enclosure completely protects the top and four sides of the inner box.

2. In combination with an inner box having a bottom, a pair of side walls foldably connected thereto, and end sections foldably connected to opposite end portions of said bottom and said side walls, an openable enclosure for said inner box comprising a top panel, a pair of side panels foldably connected thereto, one of said side panels being attached to one of said side walls, a first pair of flaps foldably connected to opposite end portions of said one side panel, said flaps being attached to the end sections of said inner box, a second pair of flaps foldably connected to opposite end portions of the other side panel, and a pair of tabs foldably attached to opposite end portions of said top panel and folded downwardly over each of said second pair of flaps and attached thereto, whereby said top panel, said second pair of flaps and said end tabs form a hinged cover disposed for movement relative to said inner box and to said one side wall and first pair of flaps of said openable enclosure which are attached to said inner box, said side panels being coextensive with the area of said side walls, and at least the portion of said end flaps adjoining said side panels extending the entire depth of said inner box, whereby said openable enclosure is adapted to entirely support a load placed on said top panel without transmitting any of the load to the inner box.

References Cited in the file of this patent

UNITED STATES PATENTS

| Number | Name | Date |
| --- | --- | --- |
| 1,137,269 | Kormanshaus | Apr. 27, 1915 |
| 1,347,309 | Upp | July 20, 1920 |
| 1,836,993 | Sidebotham | Dec. 15, 1931 |
| 1,920,810 | Schmiedel | Aug. 1, 1933 |
| 2,016,754 | Perkit | Oct. 8, 1935 |
| 2,120,258 | Moore | June 14, 1938 |
| 2,145,682 | Bergstein | Jan. 31, 1939 |
| 2,193,925 | Huye | Mar. 19, 1940 |
| 2,324,905 | Chambliss | July 20, 1943 |
| 2,330,466 | Bergstein | Sept. 28, 1943 |
| 2,342,198 | Hultin | Feb. 22, 1944 |
| 2,364,829 | Tichenor | Dec. 12, 1944 |
| 2,367,476 | Tyrseck | Jan. 16, 1945 |
| 2,430,610 | Guyer | Nov. 11, 1947 |